United States Patent
Schober

(10) Patent No.: US 7,089,380 B1
(45) Date of Patent: Aug. 8, 2006

(54) METHOD AND SYSTEM TO COMPUTE A STATUS FOR A CIRCULAR QUEUE WITHIN A MEMORY DEVICE

(75) Inventor: Richard L. Schober, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 346 days.

(21) Appl. No.: 10/434,264

(22) Filed: May 7, 2003

(51) Int. Cl.
*G06F 12/00* (2006.01)
*G06F 3/00* (2006.01)

(52) U.S. Cl. .................. 711/156; 710/57; 370/389

(58) Field of Classification Search .......... 365/230.06, 365/230.08; 370/389; 710/52, 55, 57, 310, 710/29; 711/156, 159, 171, 172, 170
See application file for complete search history.

(56) References Cited

U.S. PATENT DOCUMENTS

| | | | | |
|---|---|---|---|---|
| 5,956,340 A | * | 9/1999 | Afek et al. | 370/412 |
| 6,745,265 B1 | * | 6/2004 | Sindalovsky | 710/57 |
| 6,851,000 B1 | * | 2/2005 | Lai | 710/57 |
| 6,865,627 B1 | * | 3/2005 | Wu | 710/57 |
| 2002/0138692 A1 | * | 9/2002 | Gerhart | 711/112 |

OTHER PUBLICATIONS

Definitions, USPTO, Dec. 2002 edition.*

* cited by examiner

*Primary Examiner*—Christian P. Chace

(57) ABSTRACT

A method and system are described to compute a status for a circular queue within a memory device. A head pointer and a tail pointer are maintained to identify a head entry and a tail entry, respectively, within the queue. In response to an updating of at least one of the head pointer and the tail pointer, at least one of a near-full or a near-empty condition is detected. The detection is performed utilizing parallel operations. The detection of the near-empty and/or near-full conditions may be useful to avoid underflow and overflow errors.

39 Claims, 4 Drawing Sheets

METHOD AND SYSTEM TO COMPUTE A STATUS FOR A CIRCULAR QUEUE WITHIN A MEMORY DEVICE

FIELD OF THE INVENTION

The present invention relates generally to the field of memory management and, more specifically, to computing a status (e.g., a full, empty, near-full and near-empty condition) for a queue maintained within a memory device.

BACKGROUND OF THE INVENTION

A circular queue, or circular first-in-first-out (FIFO) memory structure, typically utilizes a block of sequential locations (a queue storage area) in a random access memory (RAM) for the storage of queue entries. A head pointer indicates the address of a first valid queue entry within the RAM, while a tail pointer indicates the address of the queue entry immediately after the last valid entry within the RAM. The head and tail pointers are typically stored outside the queue storage area, either within the RAM or associated registers.

By comparing the head and tail pointers, a determination can be made regarding the number of entries within a queue. A comparison of the head and tail pointers can also be performed with a view to assessing whether a queue is completely empty or completely full. It is often also useful to know whether a queue is nearly empty or nearly full. Near-empty and near-full warnings can then be issued to avoid queue underflow and overflow errors, respectively. Underflow is caused by a dequeue on an empty queue, while overflow is caused by an enqueue on a full queue.

SUMMARY OF THE INVENTION

According to one aspect of the present invention, a method and a system operate to compute a status for a circular queue, within a memory device, including a plurality of entries. A head pointer and a tail pointer are maintained to identify a head entry and a tail entry, respectively, within the queue. In response to an updating of at least one of the head pointer and the tail pointer, at least one of a near-full or a near-empty condition is detected. The detection is performed utilizing parallel operations.

Other aspects of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to compute a status for a circular queue, within a memory device, including a plurality of entries are described. In the following description, for purposes of explanation, numerous specific details are set forth in order to provide a thorough understanding of the present invention. It will be evident, however, to one skilled in the art that the present invention may be practiced without these specific details.

Figure 1:
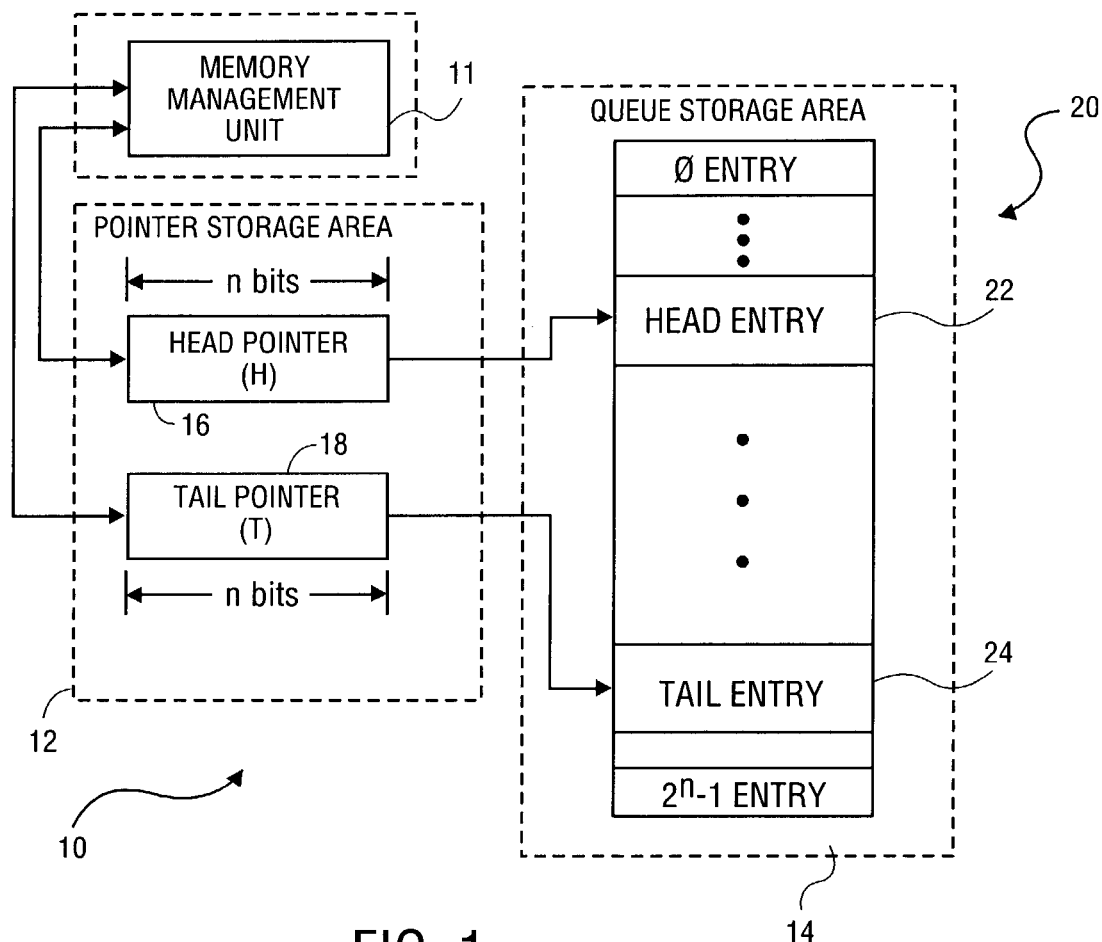
FIG. 1 is a block diagram illustrating a memory, in the exemplary form of a random access memory, having an associated pointer storage area and queue storage area, in conjunction with which an exemplary embodiment of the present invention may be deployed.

FIG. 1 is a block diagram illustrating a memory in the exemplary form of a random access memory (RAM) 10, and a memory management unit 11. The memory management unit 11 operates to receive and issue, enqueue and dequeue commands to enqueue and dequeue data within the RAM 10. The RAM 10 is shown to include a pointer storage area 12 and a queue storage area 14. A head pointer 16 and a tail pointer 18, each comprising n-bits, are stored within the pointer storage area 12. A circular FIFO or queue 20 is maintained within the queue storage area 14. The queue 20, in the exemplary embodiment, utilizes $2^n$ sequential RAM locations. In the exemplary embodiment, the queue 20 occupies a stand-alone $2^n$-word memory. However, the queue 20 could occupy a contiguous region of larger memory. In that case, a queue head and tail would be added to a base address of the queue 20.

The head pointer 16 contains the address of a first valid entry, or head entry 22, within the queue 20, unless the queue 20 is empty. The tail pointer 18 contains the address of the location immediately after the last valid entry, or tail entry 24, within the queue 20.

To add an entry to the end (or tail) of the queue 20 (i.e., to enqueue), the new entry is written into the RAM 10 to an address specified by the tail pointer 18. Thereafter, the tail pointer 18 is incremented by one modulo $2^n$. To remove an entry from the head of the queue 20 (i.e., to dequeue an entry), the relevant entry is read from an address specified by the head pointer 16. Thereafter, the head pointer 16 is incremented by one modulo $2^n$.

The exemplary queue 20 may hold anywhere from 0 entries (e.g., the queue is empty) to $2^n-1$ valid entries (e.g., the queue is full). The number of valid entries in the queue 20 at any given time is computed as follows:

Number of entries=(tailpointer−headpointer)modulo $2^n$.

When the queue is empty, the head and tail pointers 16 and 18 are equal. If all 2n entries were permitted to be filled, the head pointer 18 would also equal the tail pointer 16. In other words: $2^n$ modulo $2^n$=0 modulo $2^n$=0. By limiting the queue capacity to the capacity of the queue storage area 14 minus one location, ambiguity between a full queue and an empty queue may be avoided.

As noted above, in addition to knowing when the queue 20 is completely empty or completely full, an indication of when the queue 20 is near-empty or near-full may be useful in a number of situations. Specifically, near-empty and near-full warnings may be utilized to avoid underflow and overflow errors.

With a view to facilitating detection of near-empty and near-full conditions, one exemplary embodiment of the present invention proposes defining both a near-empty threshold and a near-full threshold, where near-empty and near-full conditions are detected as follows:

Near-empty condition=number of entries<near-empty threshold.

Near-full condition=number of entries≧near-full threshold.

To facilitate the detection of the near-empty and near-full conditions, in one exemplary embodiment of the present invention, it is useful to constrain threshold values. Specifically, the near-full threshold may be expressed in the form $2^n - 2^k$, where n>k>0. The near-empty threshold may conveniently be expressed in the form $2^k$, where n>k>0. Hence:

Near-full condition=((tailpointer−headpointer)modulo $2^n$)≧$2^n-2^k$); and

Near-empty condition=((tailpointer−headpointer) modulo $2^n$)<$2^k$.

Note that the value of k may be different for near-empty and near-full.

Given the above constraint, empty, near-empty, near-full, and full conditions may, in one embodiment, be calculated as follows:

Empty condition = tailpointer == headpointer;

Near-empty condition = ((Tu − Hu) == 00 ... 00) & (Tv ≧ Hv))
    | ((Tu − Hu) == 00 ... 01) & (Tv < Hv));

Near-full condition = ((Tu − Hu) == 11 ... 11) & (Tv ≧ Hv))
    | ((Tu − Hu) == 00 ... 00) & (Tv ≧ Hv));

Full condition = (tailpointer−headpointer) == 11 ... 11 where Tu=tailpointer [n−1:k]; Tv=tailpointer [k−1:0]; Hu=headpointer [n−1:k]; Hv=headpointer [k−1:0].

Figure 2:
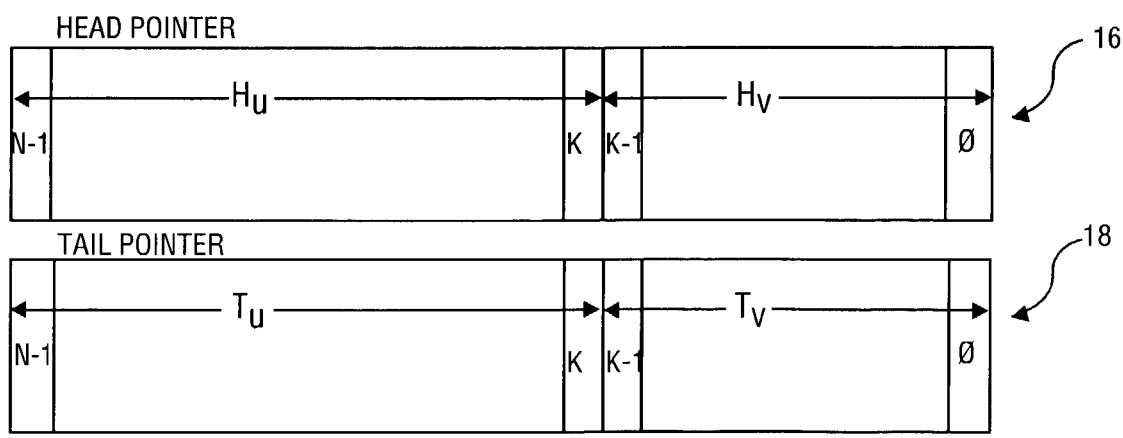
FIG. 2 is a diagrammatic representation of a head pointer and a tail pointer, according to an exemplary embodiment of the present invention, indicating the division of the head and tail pointers into upper and lower portions.

FIG. 2 is a diagrammatic representation of the head pointer 16 and the tail pointer 18, according to an exemplary embodiment of the present invention, indicating the division of the head and the tail pointers 16 and 18 into the Hu, Hv, Tu, and Tv portions.

Note that "(Tu−Hu)==00 . . . 00" is true if Tu==Hu. Methods for performing magnitude comparisons (e.g., Tu==Hu, Tv≧Hv and Tv<Hv) are outside the focus of the present embodiment. The present exemplary embodiment focuses on the direct computation of "(Tu−Hu)==00 . . . 01" and "(Tu−Hu)==11 . . . 11". It should, be noted that the computation of "(tailpointer−headpointer)==11 . . . 11" may be performed using the same method as the computation of "(Tu−Hu)==11 . . . 11". The computation of "(tailpointer−headpointer)==11 . . . 11" differs from the computation of "(Tu−Hu)==11 . . . 11" in that the "tailpointer−headpointer" computation utilizes all bits of the respective head and tail pointers 16 and 18, rather than merely the upper bits (e.g., Hu and Tu) that are utilized in the near-full computation.

First, some additional nomenclature is introduced:

$bg$ = borrow generate = $Ti < Hi$ = $\overline{\text{tailpointer}[i]}$ & headpointer[i]

$bp$ = borrow propagate = $Ti == Hi$ = $\overline{\text{tailpointer}[i] \oplus \text{headpointer}[i]}$ $bb$ = borrow block = $Ti > Hi$ = tailpointer[i] & $\overline{\text{headpointer}[i]}$ where i is a bit number, n−1≧i≧0.

To compute x=(Tu−Hu)==00 . . . 01;

$$
\begin{aligned}
x = &(bp[n-1] \;\&\; bp[n-2] \;\&\; bp[n-3] \;\&\; \ldots \;\&\; bp[k+2] \;\&\; bp[k+1] \;\&\; bb[k]) \\
 &| (bp[n-1] \;\&\; bp[n-2] \;\&\; bp[n-3] \;\&\; \ldots \;\&\; bp[k+2] \;\&\; bb[k+1] \;\&\; bg[k]) \\
 &| (bp[n-1] \;\&\; \ldots \;\&\; bp[i+1] \;\&\; bb[i] \;\&\; bg[i-1] \;\&\; \ldots \;\&\; bg[k]) \\
 &| (bp[n-1] \;\&\; bb[n-2] \;\&\; bg[n-3] \;\&\; \ldots \;\&\; bp[k+2] \;\&\; bg[k+1] \;\&\; bg[k]) \\
 &| (bb[n-1] \;\&\; bb[n-2] \;\&\; bg[n-3] \;\&\; \ldots \;\&\; bp[k+2] \;\&\; bg[k+1] \;\&\; bg[k]) \\
 &| (bg[n-1] \;\&\; bb[n-2] \;\&\; bg[n-3] \;\&\; \ldots \;\&\; bp[k+2] \;\&\; bg[k+1] \;\&\; bg[k]);
\end{aligned}
$$

The equation for x can be evaluated in $\log_2(n-k)$ pair-wise reduction steps. First, for each bit position, bp, bb, and bg are generated. Next, a set of intermediate variables $P_j$, $Q_j$, and $R_j$ is created for the reduction operation, where j specifies the reduction operation number and is in the range $0 \leq j \leq \log_2(n-k)$. The reduction is done as shown below:

$P_0[i] = bp[k+i]$;

$Q_0[i] = bb[k+i]$;

$R_0[i] = bg[k+i]$;

$P_1[i] = P_0[2i+1] \;\&\; P_0[2i]$;

$Q_1[i] = (P_0[2i+1] \;\&\; Q_0[2i]) | (Q_0[2i+1] \;\&\; R_0[2i])$;

$R_1[i] = R_0[2i+1] \;\&\; R_0[2i]$;

$P_j[i] = P_{j-1}[2i+1] \;\&\; P_{j-1}[2i]$;

$Q_j[i] = (P_{j-1}[2i+1] \;\&\; Q_{j-1}[2i]) | (P_{j-1}[2i+1] \;\&\; Q_{j-1}[2i])$;

$R_j[i] = R_{j-1}[2i+1] \;\&\; R_{j-1}[2i]$;

$x = Q_{last} = (P_{last-1}[1] \;\&\; Q_{last-1}[0])$ $| (Q_{last-1}[1] \;\&\; R_{last-1}[0])$ $| (R_{last-1}[1] \;\&\; R_{last-1}[0])$;

To compute y=(Tu−Hu)==11 . . . 11;

$$\begin{aligned} y = \ & (bp[n-1] \ \& \ bp[n-2] \ \& \ bp[n-3] \ \& \ ... \ \& \ bp[k+2] \ \& \ bp[k+1] \ \& \ bg[k]) \\ & | \ (bp[n-1] \ \& \ bp[n-2] \ \& \ bp[n-3] \ \& \ ... \ \& \ bp[k+2] \ \& \ bg[k+1] \ \& \ bb[k]) \\ & | \ (bp[n-1] \ \& \ ... \ \& \ bp[i+1] \ \& \ bg[i] \ \& \ bb[i-1] \ \& \ ... \ \& \ bb[k]) \\ & | \ (bp[n-1] \ \& \ bg[n-2] \ \& \ bb[n-3] \ \& \ ... \ \& \ bb[k+2] \ \& \ bb[k+1] \ \& \ bb[k]) \\ & | \ (bg[n-1] \ \& \ bb[n-2] \ \& \ bb[n-3] \ \& \ ... \ \& \ bb[k+2] \ \& \ bb[k+1] \ \& \ bb[k]) \\ & | \ (bb[n-1] \ \& \ bb[n-2] \ \& \ bg[n-3] \ \& \ ... \ \& \ bb[k+2] \ \& \ bb[k+1] \ \& \ bb[k]); \end{aligned}$$

Note how the equation for y has the same structure as the equation for x, except the bg's and bb's are swapped. Like x, the equation for y can be evaluated in $\log_2(n-k)$ pair-wise reduction operations. Again, intermediate variables $P_j$, $Q_j$, and $R_j$ are created for the reduction operation, where j specifies the reduction step number and is in the range $0 \leq j \leq \log_2(n-k)$. The reduction is done as shown below. Note, only step 0 is different from the equation for x. Specifically, for y the initial values of $Q_0$ and $R_0$ are swapped from what they were when solving x.

$$P_0[i] = bp[k+i];$$
$$Q_0[i] = bb[k+i];$$
$$R_0[i] = bg[k+i];$$
$$P_1[i] = P_0[2i+1] \ \& \ P_0[2i];$$
$$Q_1[i] = (P_0[2i+1] \ \& \ Q_0[2i]) \ | \ (Q_0[2i+1] \ \& \ R_0[2i]);$$
$$R_1[i] = R_0[2i+1] \ \& \ R_0[2i];$$
$$P_j[i] = P_{j-1}[2i+1] \ \& \ P_{j-1}[2i];$$
$$Q_j[i] = (P_{j-1}[2i+1] \ \& \ Q_{j-1}[2i]) \ | \ (Q_{j-1}[2i+1] \ \& \ R_{j-1}[2i]);$$
$$R_j[i] = R_{j-1}[2i+1] \ \& \ R_{j-1}[2i];$$
$$y = Q_{last} = (P_{last-1}[1] \ \& \ Q_{last-1}[0])$$
$$| \ (Q_{last-1}[1] \ \& \ R_{last-1}[0])$$
$$| \ (R_{last-1}[1] \ \& \ R_{last-1}[0]);$$

Figure 3:
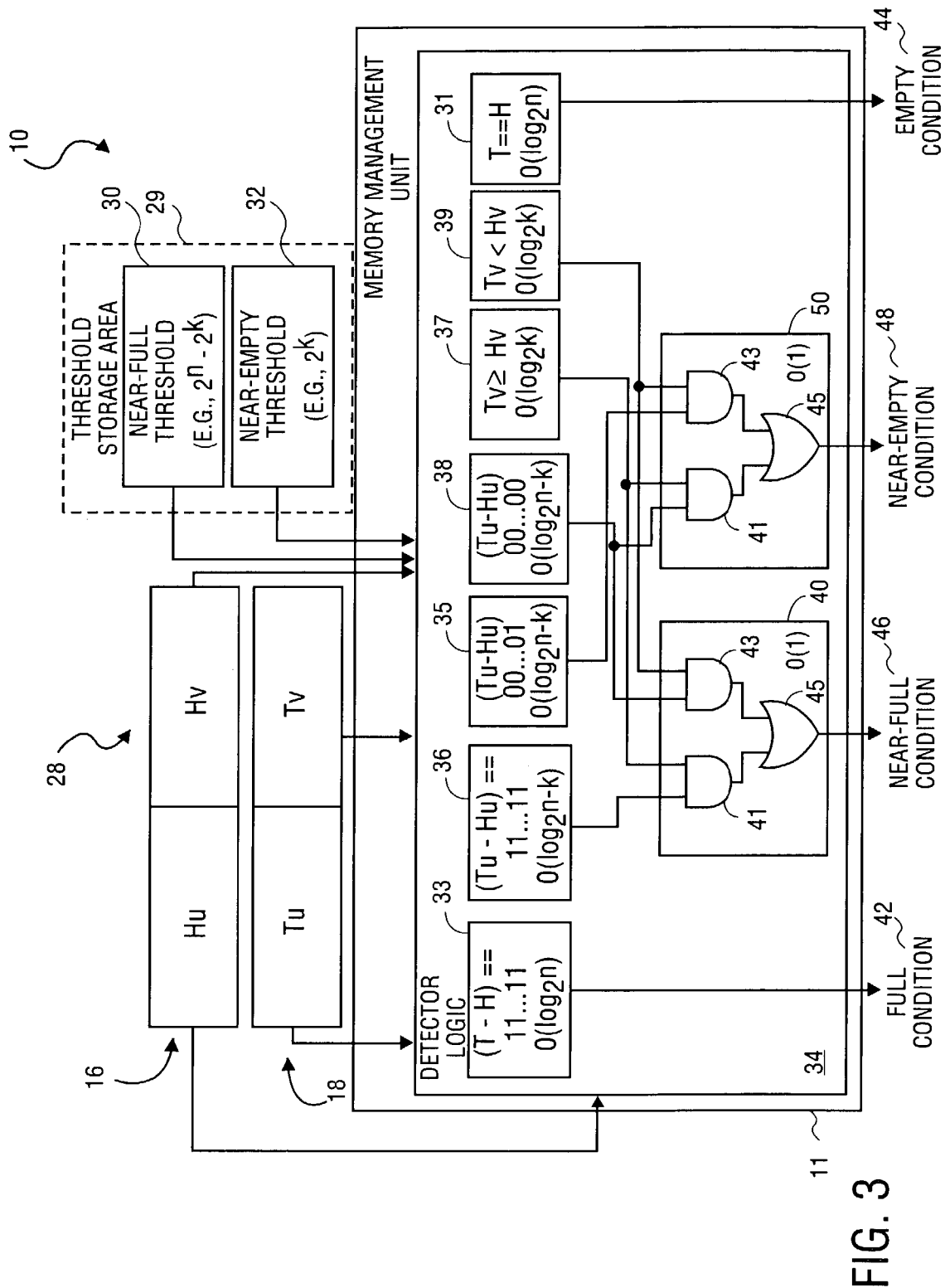
FIG. 3 is a block diagram illustrating a memory system within which an exemplary embodiment of the present invention may be implemented.

FIG. 3 is a block diagram showing a memory system, designated generally as 28, within which an exemplary embodiment of the present invention is implemented. The memory system 28 is shown to include the head pointer 16 and the tail pointer 18. In one embodiment, where a value (or values) for k is fixed or hardwired, it will be appreciated that a near-full threshold 30 and a near-empty threshold 32 are "hardwired" within the detector logic 34. In an alternative embodiment, where value(s) for k are programmable, a threshold storage area 29 within the RAM 10 (or registers associated with the RAM 10) may store a near-full threshold 30 and a near-empty threshold 32 (e.g., express is terms of k). In the exemplary embodiment, these thresholds may be specified as indicated above.

In one exemplary embodiment, the detector logic 34 may constitute part of the memory management unit 11. The head pointer 16, tail pointer 18, near-full threshold 30 and near-empty threshold 32 provide input to detector logic 34 that, utilizing these inputs, detects and indicates a full condition, an empty condition, a near-full condition, and a near-empty condition. The detector logic 34 outputs, in one exemplary embodiment, a full condition indication 42, an empty condition indication 44, and a near-full condition indication 46 and a near-empty condition indication 48. Each of the indications 42–48 may be a signal outputted on a bus for communication to systems or modules up or down stream of the detector logic 34 in a data or instruction pipeline.

Turning specifically to the detector logic 34, included is circuitry to detect the full condition, the empty condition, the near-empty condition, and the near-full condition.

Prior to describing the exemplary embodiment of the detector logic 34, it should be noted that it is common to utilize two measures to assess algorithmic complexity. The first is the time complexity of an algorithm, which is typically expressed as the number of fundamental operations required to execute an algorithm. The second is the space complexity of an algorithm, which is typically expressed as the amount of storage and or a number of basic functional hardware units required to execute an algorithm. Of course, each of time and space complexities may be a function of a particular problem size. For the purposes of the present application, it is useful to discuss the time complexity (e.g., the number of fundamental operations required to execute an algorithm) in terms of logic gate delays.

One way to compute the near-empty and the near-full conditions is to first compute the number of occupied locations in the queue:

No. of entries=(tailpointer−headpointer)module $2^n$

The number of entries is then compared with appropriate thresholds (e.g., number of entries$\geq$near-full threshold for near-full and number of entries<near-empty threshold for near-empty). The subtraction and the compare operation are each O ($\log_2 n$) time complexity operations, which are performed serially. In contrast, the approach used in the exemplary embodiment of the present invention has parallel O ($\log_2(n-k)$) and O ($\log_2 k$) time complexity operations, followed by an O (1) time complexity operation. This means that each of the near-full/near-empty detection computations have a time complexity of O ($\log_2 n$). It will be appreciated that the exemplary embodiment of the invention enables detection of a queue's near-empty and near-full conditions in less time than the above-described, alternative detection scheme.

Turning now specifically to the detector logic 34 illustrated in FIG. 3, the detector logic 34 is shown to include a number of modules 31, 33, 36, 35, 38, 37, and 39 that operate in parallel. FIG. 3 labels the operations performed by each of these modules and their time complexity.

The detector logic 34 is shown in FIG. 3 to include modules 40 and 50 that each receive the outputs of the modules 35, 36, 37, 38 and 39, and each perform an O(1) operation. The module 40 is shown to include two AND gates 41 and 43 that receive inputs from the modules 36 and 37, and modules 38 and 39, respectively. The outputs of the AND gates 41 and 43 provide input to an OR gate 45, the output of which constitutes the near-full condition indication 46. The module 50 has a similar structure, but is coupled as shown in FIG. 3 to provide an output that constitutes the near-empty condition indication 48.

It will also be noted that the output of the module 33 constitutes the full condition indication 42 and that the output of the module 31 constitutes the empty condition indication 44.

Accordingly, it will be appreciated that the detector logic 34, in one exemplary embodiment, is able to detect the near-full and near-empty conditions by utilizing certain modules of the detector logic 34 to perform the $O(\log_2)$ operations in parallel, the outputs of these operations being fed to the modules 40 and 50 for the performance of $O(1)$ operations. The ability to perform the $O(\log_2)$ operations in parallel allows the detection of a near-full and near-empty conditions in less time than if these operations were to be performed in series. Specifically, the detector logic 34 is architectured so as to decrease the time complexity of the near-full and near-empty condition detection algorithms by reducing the number of logic gate delays in these calculations. The number of logic gate delays are reduced, relative to delays that would be experienced utilizing the above-described serial subtract and compare method, by enabling the calculations performed by the modules 33, 36, 35, 38, 37, 39, and 31 to be performed substantially in parallel.

In one exemplary embodiment of the present invention, the detector logic 34 includes logic (e.g., specified by a register transfer level (RTL) netlist) to compute the empty, near-empty, near-full, and full conditions as specified above utilizing $\log_2 n$ reduction operations. Those skilled in the art would readily appreciate how to express the above calculation as an RTL netlist or as a netlist formatted in the VHSIC Hardware Description Language (VHDL), the Verilog language or the SPICE language. Netlist examples also include a behavioral-level netlist, a gate level netlist, or a transistor level netlist.

Figure 4:
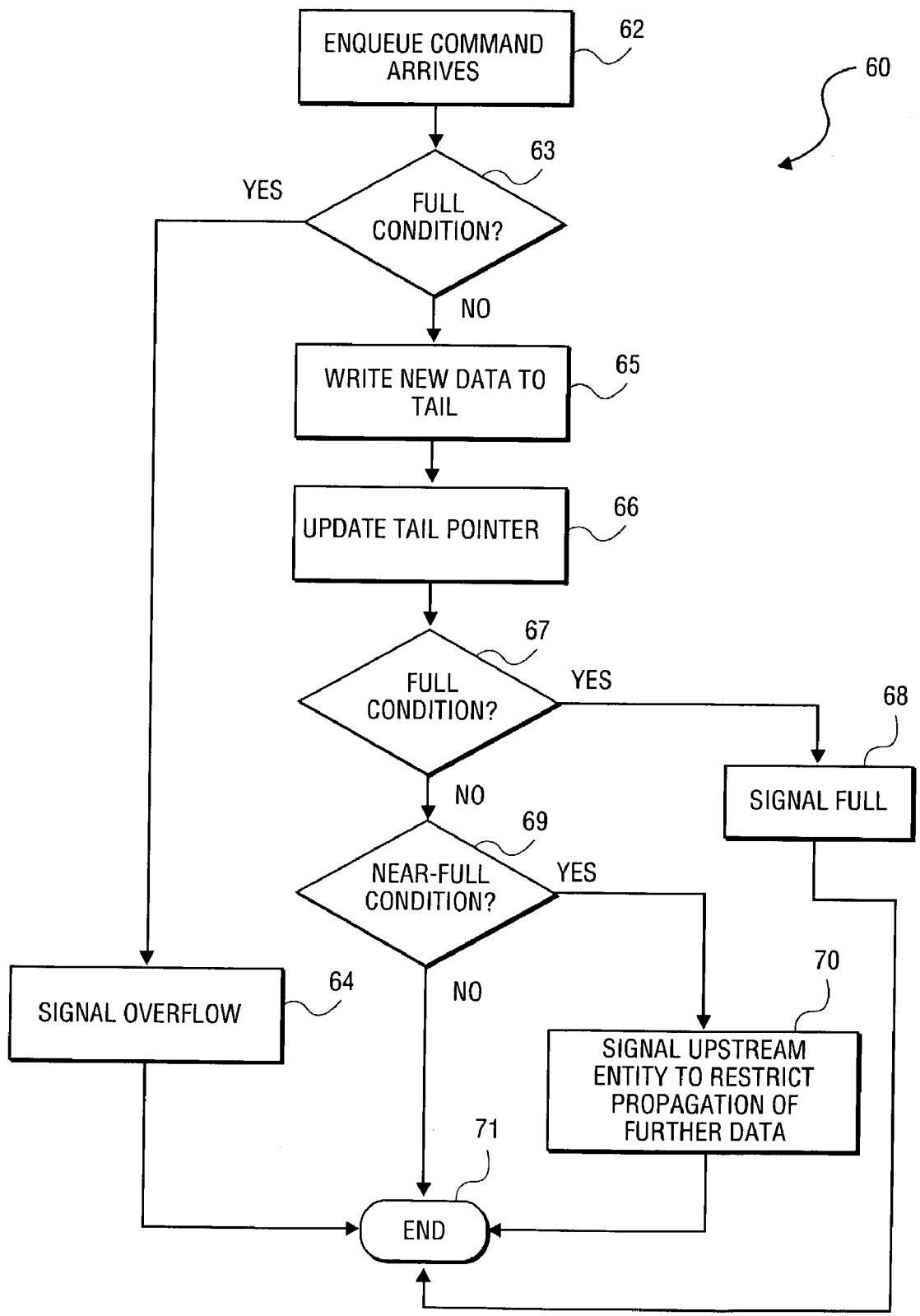
FIG. 4 is a flow chart illustrating a method, according to an exemplary embodiment of the present invention, to compute a status update for a circular queue maintained within a memory system, and specifically to detect a near-full condition.

FIG. 4 is a flow chart illustrating a method 60, according to an exemplary embodiment of the present invention, to compute a status update for a circular queue 20, maintained within a memory system 28 and including a plurality of entries, and to detect a near-full condition. The method 60 assumes the maintenance of the head pointer 16 and the tail pointer 18.

At operation 62, a command for a new entry to be queued (i.e., added to the end or tail) within the queue 20 arrives at the memory system 28 and, more specifically, at the memory management unit 11.

At decision operation 63, a determination is made by the memory management unit 11 as to whether a full condition has been detected. For example, the full condition may be detected as specified above. If so, an overflow is signaled at operation 64

If a full condition is not detected at decision operation 63, the method 60 proceeds to operation 65 where the new data is written to the tail of the queue 20, as identified by the tail pointer 18. At operation 66, the tail pointer 18 is then updated (e.g., incremented modulo $2^n$) to point to a next location within the queue 20.

At decision operation 67, a determination is again made by the memory management unit 11 as to whether a full condition for the queue 20 has been detected. If so, the full condition is signaled at operation 68.

On the other hand, following a negative determination at decision operation 67 by the detector logic 34, a near-full condition detection operation is performed at decision operation 69. In the exemplary embodiment, the near-full condition detection operation is performed by the detector logic 34, in the manner described above with reference to FIG. 3.

Following a positive determination at decision operation 69, the near-full condition indication 46 may be asserted at operation 70 to signal an upstream entity to restrict the propagation of further data to the memory system 28. The method 60 then terminates at operation 71.

Figure 5:
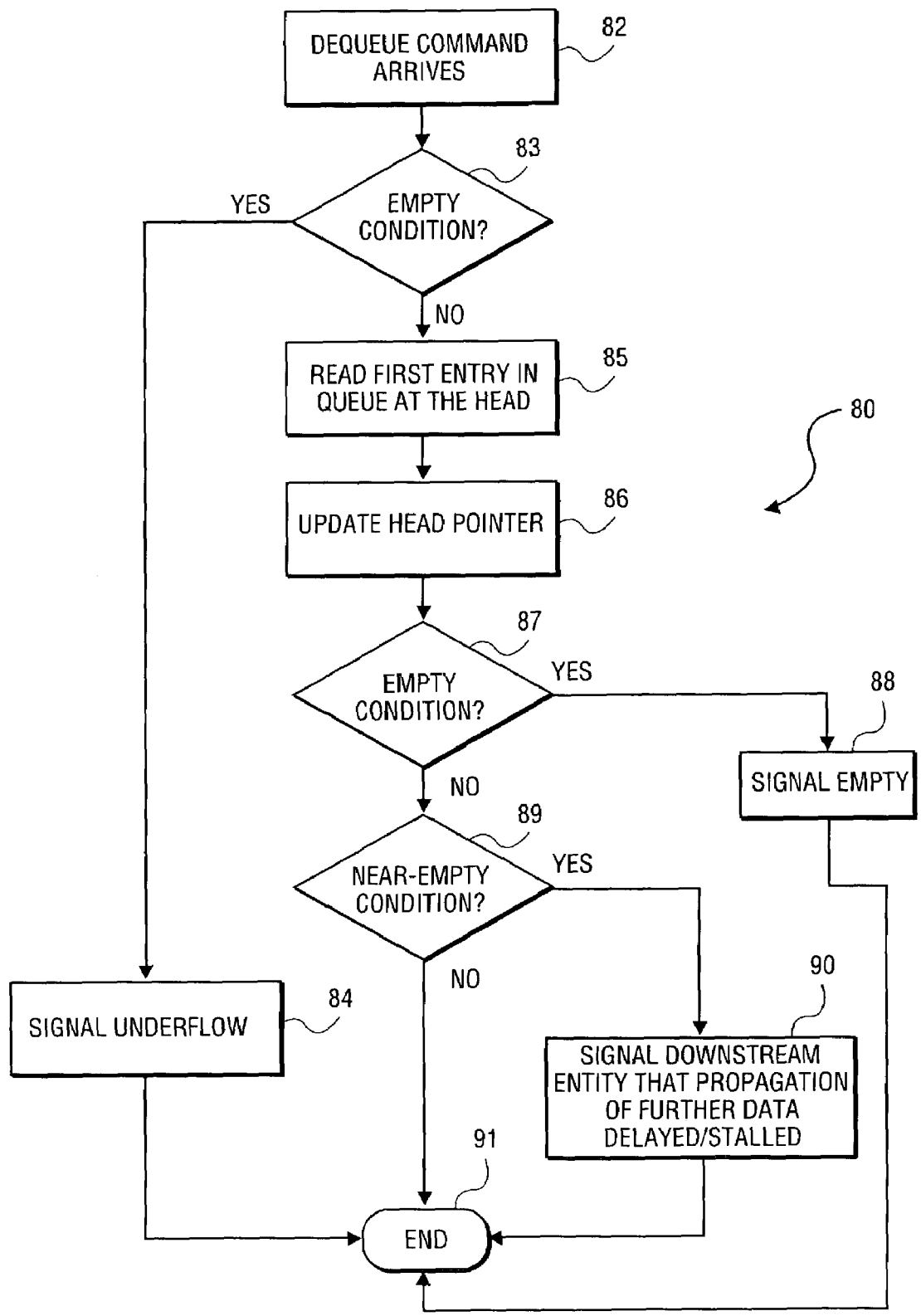
FIG. 5 is a flow chart illustrating a method, according to an exemplary embodiment of the present invention, to compute a status for circular queue within a memory system, and specifically to detect a near-empty condition.

FIG. 5 is a flow chart illustrating a method 80, according to an exemplary embodiment of the present invention, to compute the status of a circular queue 20, within a memory system 28 and including a plurality of entries, and to detect a near-empty condition. In one embodiment, the method 80 may be performed by the detector logic 34 described above with reference to FIG. 3. Again, the method 80 assumes the maintenance of the head pointer 16 and the tail pointer 18 to identify a head entry 22 and a tail entry 24, respectively, within queue 20.

The method 80 commences at operation 82 with the arrival of a dequeue command at the memory management unit 11. At decision operation 83, a determination is made as to whether an empty condition exists. Specifically, the detector logic 34 may, as described above with reference to FIG. 3 and the above provided formulas, detect an empty condition.

Following a positive determination at decision operation 83, an underflow is signaled at operation 84.

If an empty condition is not detected at decision operation 83, the method 80 proceeds to operation 85, where the first entry within the queue 20 is read from a head entry 22 identified by the head pointer 16. At operation 86, the head pointer 16 is updated (e.g., incremented modulo $2^n$).

At decision operation 87, a determination is again made as to whether an empty condition has been reached. If so, at operation 88, the empty condition is signaled.

On the other hand, following a negative determination at decision operation 87, the method 80 proceeds to decision operation 89.

At decision operation 89, a determination is made as to whether a near-empty condition has been detected. Specifically, the detector logic 34 operates to detect the near-empty condition in the manner described above with reference to FIG. 3 and the above described formulas.

Following a positive determination at decision operation 89, the detector logic 34, at operation 90, signals downstream entities that the propagation of further data from the memory system 28 may be delayed or stalled. This signaling is performed by assertion of the near-empty condition indication 48. The method 80 then terminates operation 91.

Embodiments of the present invention may be deployed in conjunction with a memory system and within a wide variety of devices and systems, ranging from a processor (e.g., a general purpose microprocessor, a graphics processor, an application specific integrated circuit (ASIC), a field programmable gate array (FPGA), or any other data processing circuit) or system (e.g., a computer, switch, router, repeater, or other device). A memory system 28, within which an embodiment of the present invention may be deployed, may be integrated within a larger device or system or may be a memory system that is accessed or associated with a device or system.

Also note that embodiments of the present invention may be implemented not only within a physical device (e.g., on a semiconductor chip) but also within a machine-readable medium. For example, the circuits and designs described above may be stored upon and/or embedded within a machine-readable medium associated with a design tool used for designing semiconductor devices. For example, an embodiment of the present invention may be stored, at least partially, as a netlist on a machine-readable medium. Furthermore, netlist files or other machine-readable medium for semiconductor chip design may be used in a simulation environment to perform the methods of the invention as described above.

Thus, it will be understood that embodiments of the present invention may be used as, or to support, a software program executed on some form of processing core (e.g., the CPU of a computer), or otherwise implemented or realized upon or within a machine-readable medium. A machine-readable medium may include any mechanism for storing or transmitting information in a form readable by a machine (e.g., a computer). For example, a machine-readable medium may include read-only memory (ROM), random access memory (RAM), magnetic storage media, optical storage media, flash memory devices, electrical, optical, acoustical or other forms of propagated signals (e.g., carrier waves, inferred signals, digital signals, etc.).

Thus, a method and system to compute a status for a circular queue, within a memory device and including a plurality of entries, have been described. Although the present invention has been described with reference to specific exemplary embodiments, it will be evident that various modifications and changes may be made to these embodiments without departing from the broader scope and spirit of the invention.

What is claimed is:

1. A method to compute a status for a circular queue within a memory system, the queue including a plurality of entries, the method including:
   maintaining a head pointer and a tail pointer to identify a head entry and a tail entry, respectively, within the queue; and
   in response to an updating of at least one of the head pointer and the tail pointer, calculating a plurality of values from first and second portions of one of the head and tail pointers and from the other of the head and tail pointers, and
   calculating from the plurality of values one of a near-full condition indicator and a near-empty condition indicator.

2. The method of claim 1, wherein simultaneously calculating the plurality of values has a time complexity of O (log2n) logic gate delays, and each comprise an O (log2n) time operation, and
   wherein the queue includes 2n entries and the head pointer and the tail pointer are each n-bit values.

3. The method of claim 2, including maintaining at least one of a near-full threshold and a near-empty threshold, the method including utilizing at least one of the near-full threshold and the near-empty threshold to detect at least one of a near-full condition and a near-empty condition.

4. The method of claim 1 wherein calculating the plurality of values comprises calculating each of the values simultaneously.

5. The method of claim 1 wherein calculating the plurality of values comprises calculating the plurality of values from first and second portions of the head pointer and from first and second portions of the tail pointer.

6. The method of claim 1 wherein calculating one of the near-full condition indicator and the near-empty condition indicator comprises simultaneously calculating from the plurality of values the near-full condition indicator and the near-empty condition indicator.

7. A method to compute a status for a circular queue within a memory system, the queue including a plurality of entries, the method including:
   maintaining a head pointer and a tail pointer to identify a head entry and a tail entry, respectively, within the queue; and
   in response to an updating of at least one of the head pointer and the tail pointer, detecting at least one of a near-full condition and a near-empty condition,
   wherein the detection is performed utilizing parallel operations, and
   wherein the near-full threshold is expressed as:
   $2n-2k$, where $n>k>0$, and the near-full condition is detected automatically by determining whether:

$$\text{near-full condition} = ((\text{tailpointer}-\text{headpointer}) \bmod 2n) = 2n-2k.$$

8. The method of claim 7, wherein the near-full condition is detected by automatically determining whether:

$$\text{near-full condition} = ((Tu - Hu) == 11 \ldots 11) \ \& \ (Tv \geq Hv))$$
$$((Tu - Hu) == 00 \ldots 00) \ \& \ (Tv \geq Hv));$$

where $Tu$=tailpointer $[n-1:k]$; $Tv$=tailpointer $[k-1:0]$; $Hu$=headpointer $[n-1:k]$; $Hv$=headpointer $[k-1:0]$.

9. The method of claim 8, wherein $(Tu-Hu)==11 \ldots 11$ is calculated as:

$(bp[n-1] \& bp[n-2] \& bp[n-3] \& \ldots \& bp[k+2] \& bp[k+1] \& bg[k])$ $| (bp[n-1] \& bp[n-2] \& bp[n-3] \& \ldots \& bp[k+2] \& bg[k+1] \& bb[k])$ $| (bp[n-1] \& \ldots \& bp[i+1] \& bg[i] \& bb[i-1] \& \ldots \& bb[k])$ $| (bp[n-1] \& bg[n-2] \& bb[n-3] \& \ldots \& bb[k+2] \& bb[k+1] \& bb[k])$ $| (bg[n-1] \& bb[n-2] \& bb[n-3] \& \ldots \& bb[k+2] \& bb[k+1] \& bb[k])$ $| (bb[n-1] \& bb[n-2] \& bb[n-3] \& \ldots \& bb[k+2] \& bb[k+1] \& bb[k]);$ where:

$bg$ = borrow generate = $Ti < Hi$ = $tailpointer[i] \& headpointer[i]$ $bp$ = borrow propagate = $Ti == Hi$ = $tailpointer[i]?headpointer[i]$ $bb$ = borrow block = $Ti > Hi$ = $tailpointer[i] \& headpointer[i]$ 10. The method of claim 9, wherein the equation for $(Tu-Hu)==11 \ldots 11$ is evaluated in $\log_2(n-k)$ stages of pair-wise reduction operations.

11. The method of claim 10, wherein bg, bp and bb are generated for each bit position, and a set of intermediate variables $Pj$, $Qj$, and $Rj$ are generated for the reduction operation where j specifies a reduction step number of the reduction operation and is in a range $0=j=\log_2(n-k)$.

12. The method of claim 11, wherein the pair wise reduction operation is performed as follows:

$P0[I] = bp[k+i]$;
$Q0[i] = bg[k+i]$;
$R0[i] = bb[k+i]$;
$P1[i] = P0[2i+1] \& P0[2i]$;
$Q1[i] = (P0[2i+1] \& Q0[2i]) | (Q0[2i+1] \& R0[2i])$;
$R1[i] = R0[2i+1] \& R0[2i]$;
$Pj[i] = Pj-1[2i+1] \& Pj-1[2i]$;
$Qj[i] = (Pj-1[2i+1] \& Qj-1[2i]) | (Qj-1[2i+1] \& Rj-1[2i])$;
$Rj[i] = Rj-1[2i+1] \& Rj-1[2i]$;
$y = Q_{last} = (P_{last-1}[1] \& Q_{last-1}[0])$
  $| (Q_{last-1}[1] \& R_{last-1}[0])$
  $| (R_{last-1}[1] \& R_{last-1}[0])$;

where $y=(Tu-Hu)==11\ldots 11$.

13. A method to compute a status for a circular queue within a memory system, the queue including a plurality of entries, the method including:

maintaining a head pointer and a tail pointer to identify a head entry and a tail entry, respectively, within the queue; and in response to an updating of at least one of the head pointer and the tail pointer, detecting at least one of a near-full condition and a near-empty condition, wherein the detection is performed utilizing parallel operations, and wherein the near-empty threshold is expressed as:

2k, where n>k>0, and the near-empty condition is detected by automatically determining whether:

near-empty condition=((tailpointer−headpointer) modulo $2n$)<$2k$.

14. The method of claim 13, wherein the near-empty condition is detected by automatically determining whether:

$near-empty\ condition = ((Tu - Hu) == 00 \ldots 00)\ \&(Tv = Hv))$
$| ((Tu - Hu) == 00 \ldots 01)\ \&(Tv < Hv))$;

where Tu=tailpointer [n−1:k]; Tv=tailpointer [k−1:0]; Hu=headpointer [n−1:k]; Hv=headpointer [k−1:0].

15. The method of claim 14, wherein $(Tu-Hu)==00\ldots 01$ is calculated as:

$(bp[n-1] \& bp[n-2] \& bp[n-3] \& \ldots \& bp[k+2] \& bp[k+1] \& bb[k])$ $| (bp[n-1] \& bp[n-2] \& bp[n-3] \& \ldots \& bp[k+2] \& bb[k+1] \& bg[k])$ $| (bp[n-1] \& \ldots \& bp[i+1] \& bb[i] \& bg[i-1] \& \ldots \& bg[k])$ $| (bp[n-1] \& bb[n-2] \& bg[n-3] \& \ldots \& bg[k+2] \& bg[k+1] \& bg[k])$ $| (bb[n-1] \& bg[n-2] \& bg[n-3] \& \ldots \& bg[k+2] \& bg[k+1] \& bg[k])$ $| (bg[n-1] \& bg[n-2] \& bg[n-3] \& \ldots \& bg[k+2] \& bg[k+1] \& bg[k])$ where:

$bg$ = borrow generate = $Ti < Hi$ = $tailpointer[i]\ \&headpointer[i]$ $bp$ = borrow propagate = $Ti == Hi$ = $tailpointer[i]\,?\,headpointer[i]$ $bb$ = borrow block = $Ti > Hi$ = $tailpointer[i]\ \&headpointer[i]$ 16. The method of claim 15 wherein an equation for $(Tu-Hu)==00\ldots 01$ is evaluated in $\log_2(n-k)$ stages of pair-wise reduction operations.

17. The method of claim 16 wherein bg, bp and bb are generated for each bit position, and a set of intermediate variables Pj, Qj, and Rj are generated for the reduction operation where j specifies a reduction step number of the reduction operation and is in a range $0=j=\log_2(n-k)$.

18. The method of claim 17 wherein the pair wise reduction operation is performed as follows:

$P_0[i] = bp[k+i]$;
$Q_0[i] = bb[k+i]$;
$R_0[i] = bg[k+i]$;
$P_1[i] = P_0[2i+1] \& P_0[2i]$;
$Q_1[i] = (P_0[2i+1] \& Q_0[2i]) | (Q_0[2i+1] \& R_0[2i])$;
$R_1[i] = R_0[2i+1] \& R_0[2i]$;
$P_j[i] = P_{j-1}[2i+1] \& P_{j-1}[2i]$;
$Q_j[i] = (P_{j-1}[2i+1] \& Q_{j-1}[2i]) | (Q_{j-1}[2i+1] \& R_{j-1}[2i])$;
$R_j[i] = R_{j-1}[2i+1] \& R_{j-1}[2i]$;
$x = Q_{last} = (P_{last-1}[1] \& Q_{last-1}[0])$
  $| (Q_{last-1}[1] \& R_{last-1}[0])$
  $| (R_{last-1}[1] \& R_{last-1}[0])$;

where $x=(Tu-Hu)==00\ldots 01$.

19. Apparatus to compute a status for a circular queue within a memory system, the queue including a plurality of entries, the apparatus including:

a memory management unit to maintain a head pointer and a tail pointer to identify a head entry and a tail entry, respectively, within the queue; and a detector, in response to an updating of at least one of the head pointer and the tail pointer, calculate a plurality of values from first and second portions of one of the head and tail pointers and from the other of the head and tail pointers, and calculate from the plurality of values one of a near-full condition indicator and a near-empty condition indicator.

20. The apparatus of claim 19, wherein the detector includes modules to simultaneously calculate the plurality of values, each of the modules having a time complexity of O ($\log_2 n$) logic gate delays and each of the modules comprising an O ($\log_2 n$) time operation, and wherein the queue includes $2^n$ entries and the head pointer and the tail pointer are each n-bit values.

21. The apparatus of claim 20, wherein the apparatus records at least one of a near-full threshold and a near-empty threshold, the detector to utilize at least one of the near-full threshold and the near-empty threshold to detect at least one of a near-full condition and a near-empty condition.

22. An apparatus to compute a status for a circular queue within a memory system, the queue including a plurality of entries, the apparatus including:

a memory management unit to maintain a head pointer and a tail pointer to identify a head entry and a tail entry, respectively, within the queue; and a detector, in response to an updating of at least one of the head pointer and the tail pointer, to detect at least one of a near-full condition and a near-empty condition, wherein the detection is performed by the detector utilizing parallel operations computing a value of the plurality of entries and comparing the value to at least one of a near-full-condition and a near-empty-condition threshold value, wherein the near-full threshold is expressed as:

$2^n - 2^k$, where $n > k > 0$, and the detector is automatically to detect the near-full condition by determining whether:

near-full condition=((tailpointer−headpointer)modulo $2^n$)=$2^n - 2^k$.

23. An apparatus to compute a status for a circular queue within a memory system, the queue including a plurality of entries, the apparatus including:
a memory management unit to maintain a head pointer and a tail pointer to identify a head entry and a tail entry, respectively, within the queue; and
a detector, in response to an updating of at least one of the head pointer and the tail pointer, to detect at least one of a near-full condition and a near-empty condition, wherein the detection is performed by the detector utilizing parallel operations computing a value of the plurality of entries and comparing the value to at least one of a near-full-condition and a near-empty-condition threshold value,
wherein the near-empty threshold is expressed as:

$2^k$, where $n > k > 0$, and the detector is automatically to detect the near-empty condition by determining whether:

near-empty condition=((tailpointer−headpointer) modulo $2^n$)<$2^k$.

24. The apparatus of claim 23, wherein the detector is to detect the near-full condition by automatically determining whether:

near − full condition = ((Tu − Hu) == 11 ... 11) &(Tv = Hv))

| ((Tu − Hu) == 00 ... 00) &(Tv < Hv));

where Tu=tailpointer [n−1:k]; Tv=tailpointer [k−1:0]; Hu=headpointer [n−1:k]; Hv=headpointer [k−1:0].

25. The apparatus of claim 24, wherein the detector is to detect the near-empty condition by automatically determining whether:

near − empty condition = ((Tu − Hu) == 00 ... 00) &(Tv = Hv))

| ((Tu − Hu) == 00 ... 01) &(Tv < Hv));

where Tu=tailpointer [n−1:k]; Tv=tailpointer [k−1:0]; Hu=headpointer [n−1:k]; Hv=headpointer [k−1:0].

26. The apparatus of claim 25, wherein the detector is to calculate (Tu−Hu)==00 . . . 01 as:

$(bp[n−1]$ & $bp[n−2]$ & $bp[n−3]$ & ... & $bp[k+2]$ & $bp[k+1]$ & $bb[k])$

| $(bp[n−1]$ & $bp[n−2]$ & $bp[n−3]$ & ... & $bp[k+2]$ & $bb[k+1]$ & $bg[k])$

| $(bp[n−1]$ & ... & $bp[i+1]$ & $bb[i]$ & $bg[i−1]$ & ... & $bg[k])$

| $(bp[n−1]$ & $bb[n−2]$ & $bg[n−3]$ & ... & $bg[k+2]$ & $bg[k+1]$ & $bg[k])$

| $(bb[n−1]$ & $bg[n−2]$ & $bg[n−3]$ & ... & $bg[k+2]$ & $bg[k+1]$ & $bg[k])$

| $(bg[n−1]$ & $bg[n−2]$ & $bg[n−3]$ & ... & $bg[k+2]$ & $bg[k+1]$ & $bg[k])$ where:

bg = borrow generate = $Ti < Hi$ = tailpointer[i] &headpointer[i]

bp = borrow propagate = $Ti == Hi$ = tailpointer[i] ?headpointer[i]

bb = borrow block = $Ti > Hi$ = tailpointer[i] &headpointer[i]

27. The apparatus of claim 26, wherein the detector is to evaluate an equation for (Tu−Hu)==00 . . . 01 in $\log_2(n−k)$ stages of pair-wise reduction operations.

28. The apparatus of claim 27 wherein bg, bp and bb are generated for each bit position, and a set of intermediate variables $P_j$, $Q_j$, and $R_j$ are generated for the reduction operation where j specifies a reduction step number of the reduction operation and is in a range $0 = j = \log_2(n−k)$.

29. The apparatus of claim 28, wherein the detector is to perform the pair wise reduction operation as follows:

$P_0[i]$ = $bp[k+i]$;
$Q_0[i]$ = $bb[k+i]$;
$R_0[i]$ = $bg[k+i]$;
$P_1[i]$ = $P_0[2i+1]$ & $P_0[2i]$;
$Q_1[i]$ = $(P_0[2i+1]$ & $Q_0[2i])$ | $(Q_0[2i+1]$ & $R_0[2i])$;
$R_1[i]$ = $R_0[2i+1]$ & $R_0[2i]$;
$P_j[i]$ = $P_{j−1}[2i+1]$ & $P_{j−1}[2i]$;
$Q_j[i]$ = $(P_{j−1}[2i+1]$ & $Q_{j−1}[2i])$ | $(Q_{j−1}[2i+1]$ & $R_{j−1}[2i])$;
$R_j[i]$ = $R_{j−1}[2i+1]$ & $R_{j−1}[2i]$;
x = $Q_{last} = (P_{last−1}[1]$ & $Q_{last−1}[0])$
| $(Q_{last−1}[1]$ & $R_{last−1}[0])$
| $(R_{last−1}[1]$ & $R_{last−1}[0])$;

where x=(Tu−Hu)==00 . . . 01.

30. The apparatus of claim 21, wherein the detector is to calculate (Tu−Hu)==11 . . . 11 as:

$(bp[n−1]$ & $bp[n−2]$ & $bp[n−3]$ & ... & $bp[k+2]$ & $bp[k+1]$ & $bg[k])$

| $(bp[n−1]$ & $bp[n−2]$ & $bp[n−3]$ & ... & $bp[k+2]$ & $bg[k+1]$ & $bb[k])$

| $(bp[n−1]$ & ... & $bp[i+1]$ & $bg[i]$ & $bb[i−1]$ & ... & $bb[k])$

| $(bp[n−1]$ & $bg[n−2]$ & $bb[n−3]$ & ... & $bb[k+2]$ & $bb[k+1]$ & $bb[k])$

| $(bg[n−1]$ & $bb[n−2]$ & $bb[n−3]$ & ... & $bb[k+2]$ & $bb[k+1]$ & $bb[k])$

| $(bb[n−1]$ & $bb[n−2]$ & $bb[n−3]$ & ... & $bb[k+2]$ & $bb[k+1]$ & $bb[k])$;

where:

bg = borrow generate = $Ti < Hi$ = tailpointer[i] &headpointer[i]

bp = borrow propagate = $Ti == Hi$ = tailpointer[i] ?headpointer[i]

bb = borrow block = $Ti > Hi$ = tailpointer[i] &headpointer[i]

31. The apparatus of claim 30, wherein the detector is to evaluate the equation for (Tu−Hu)==11 ... 11 in log2(n−k) stages of pair-wise reduction operations.

32. The apparatus of claim 31, wherein bg, bp and bb are generated for each bit position, and a set of intermediate variables $P_j$, $Q_j$, and $R_j$ are generated for the reduction operation where j specifies a reduction step number of the reduction operation and is in a range $0=j=\log_2(n-k)$.

33. The apparatus of claim 32, wherein detector is to perform the pair wise reduction operation as follows:

$$\begin{aligned}
P_0[I] &= bp[k+i]; \\
Q_0[i] &= bg[k+i]; \\
R_0[i] &= bb[k+i]; \\
P_1[i] &= P_0[2i+1] \& P0_0[2i]; \\
Q_1[i] &= (P_0[2i+1] \& Q_0[2i]) | (Q_0[2i+1] \& R_0[2i]); \\
R_1[i] &= R_0[2i+1] \& R_0[2i]; \\
P_j[i] &= P_{j-1}[2i+1] \& P_{j-1}[2i]; \\
Q_j[i] &= (P_{j-1}[2i+1] \& Q_{j-1}[2i]) | (Q_{j-1}[2i+1] \& R_{j-1}[2i]); \\
R_j[i] &= R_{j-1}[2i+1] \& R_{j-1}[2i]; \\
y &= Q_{last} = (P_{last-1}[1] \& Q_{last-1}[0]) \\
&\quad | (Q_{last-1}[1] \& R_{last-1}[0]) \\
&\quad | (R_{last-1}[1] \& R_{last-1}[0]);
\end{aligned}$$

where y=(Tu−Hu)==11 ... 11.

34. A tangibly embodied machine-readable medium storing a description of a circuit, said circuit comprising a detector, in response to an updating of at least one of a head pointer and a tail pointer for a queue, calculate a plurality of values from first and second portions of one of the head and tail pointers and from the other of the head and tail pointers, and calculate from the plurality of values one of a near-full condition indicator and a near-empty condition indicator.

35. The tangibly embodied machine-readable medium of claim 34, wherein the description comprises a behavioral level description of the circuit.

36. The tangibly embodied machine-readable medium of claim 35, wherein the behavioral level description is compatible with a VHDL format.

37. The tangibly embodied machine-readable medium of claim 35, wherein the behavioral level description is compatible with a Verilog format.

38. The tangibly embodied machine-readable medium of claim 34, wherein the description comprises a register transfer level netlist.

39. The tangibly embodied machine-readable medium of claim 34, wherein the description comprises a transistor level netlist.

* * * * *